UNITED STATES PATENT OFFICE.

EGBERT MARSH AND EDWARD W. MARSH, OF BRIDGEPORT, CONNECTICUT.

COMPOSITION OF MATTER TO BE USED AS A PLASTER FOR BUILDING PURPOSES.

SPECIFICATION forming part of Letters Patent No. 321,620, dated July 7, 1885,

Application filed October 10, 1884. (No specimens.)

*To all whom it may concern:*

Be it known that we, EGBERT MARSH and EDWARD W. MARSH, citizens of the United States, residing at Bridgeport, in the county of Fairfield and State of Connecticut, have invented a new and useful Composition of Matter to be Used as a Plaster for Building Purposes; and we do hereby declare the following to be a full, clear, and exact description of the invention, such as will enable others skilled in the art to which it appertains to make and use the same.

Our composition consists of the following ingredients, combined in substantially the proportions stated, namely: Water, four to six gallons; solution of lac, (five ounces to the gallon,) four gallons; calcined gypsum, seventy-five to one hundred and twenty pounds; sand, two hundred pounds. These ingredients are to be thoroughly mingled by agitation.

The lac may be dissolved by boiling it with one-half the quantity, by weight, of caustic soda. For example, put twenty ounces of lac and ten ounces caustic soda in four gallons water and boil.

The gist of our invention lies in the discovery of the remarkable properties of the resin lac when used in connection with calcined gypsum in the preparation of plaster or mortar for building purposes. The lac used may be in any of the forms known to commerce, as shellac, stick-lac, seed-lac, button-lac, lump-lac, plate-lac, &c. We preferably, however, use the grade known to the trade as "orange-shellac."

We are well aware that it has been common for many years to use solutions of glue in varying proportions in plasters containing calcined gypsum for the purpose of retarding the setting of the gypsum. The results attending the use of glue, however, for this purpose have been in many respects unsatisfactory, owing to the fact that glue, as well as gypsum, is remarkable for its property of absorbing water, which renders any plaster containing both glue and gypsum of little value for exterior walls and objectionable for interior walls, especially where the walls are exposed to the action of moisture.

We have discovered by numerous experiments that lac, when used in connection with calcined gypsum, possesses the following properties. First, it retards the setting of the gypsum; secondly, it renders the finished wall much harder than the pure gypsum before grinding, and tougher than ordinary lime walls; and, thirdly, to a great extent it counteracts the tendency of the gypsum to absorb water, and makes the completed wall so nearly impervious to moisture as to render this composition a desirable material, (not only for the ordinary rough coat for walls, but also with Portland cement,) for the manufacture of bricks and artificial stone for outside stucco-work, and for various ornamental and artistic uses where the surface is exposed to the weather.

It will, of course, be understood that the proportions of the ingredients in this composition may be varied within reasonable limits without changing the character of the composition. As stated above, the essential feature of our invention consists in the use of lac. We have made numerous experiments in which we have varied the strength of the lac solution or changed the relative quantity of lac in the composition. As a result it may be stated, briefly, that the greater the quantity of lac that is used relatively to the quantity of calcined gypsum, the longer the setting of the composition will be delayed. We have adopted the proportions of the ingredients as stated above as giving the best general results. In experiments, using the proportions stated above, we have found that the plaster will set (under ordinary circumstances) in from two to three hours.

We have also made numerous experiments in which the relative quantities of calcined gypsum and sand were varied. Using two hundred parts of sand, we have used gypsum in proportions varying from seventy-five to one hundred and twenty parts. It may be generally stated that increasing the quantity of gypsum within these limits slightly increases the hardness of the composition when thoroughly dried, at the same time increasing its cost.

We have found that the ingredients mixed in proportions as stated above make an exceedingly tough and strong plaster for the rough coating of walls without the use of hair, grass, manila, or any other similar substance; but either of them may be used if deemed advisable, and will of course add to the strength of the plaster or mortar.

When used for partition-walls in fire-proof buildings, or for outside stucco-work, or outside ornamentation, we add to the ingredients stated above Portland cement in the proportion of from four to ten per cent. of the composition.

In mixing the ingredients, if the quantity of water stated should not prove quite sufficient, the slight additional amount required may be added without affecting the character of the composition in the slightest. When wet hair is used a little less water is required. If the sand is perfectly dry, a little more is required than if it is moist; likewise, if the relative quantity of calcined gypsum is increased, a little more water will be required. These are matters that must necessarily be left to the judgment of the person who mixes the ingredients.

Having thus described our invention, we claim—

The herein-described compound for building purposes, consisting of calcined gypsum, sand, and water, in substantially the proportions stated, with the addition thereto, as a means of hardening the compound and delaying the setting for a predetermined time, of substantially the proportions stated of the resin lac dissolved in solution of caustic soda.

In testimony whereof we affix our signatures in presence of two witnesses.

EGBERT MARSH.
EDWARD W. MARSH.

Witnesses:
A. M. WOOSTER,
ORANGE MERWIN.